(12) United States Patent
Xiao et al.

(10) Patent No.: US 9,823,425 B2
(45) Date of Patent: Nov. 21, 2017

(54) DUST-PROOF APPARATUS AND FIBER OPTIC CONNECTOR ASSEMBLY

(71) Applicants: ADC Telecommunications (Shanghai) Distribution Co., Ltd., Shanghai (CN); ADC Communications (Australia) Pty Limited, New South Wales (AU)

(72) Inventors: Teller Xiao, Shanghai (CN); Yanhong Yang, Shanghai (CN); Eric Wang, Shanghai (CN); Paul Hubbard, New South Wales (AU)

(73) Assignee: ADC Telecommunications (Shanghai) Distribution Co., Ltd., Shanghai (CN)

( * ) Notice: Subject to any disclaimer, the term of this patent is extended or adjusted under 35 U.S.C. 154(b) by 0 days.

(21) Appl. No.: 14/739,290

(22) Filed: Jun. 15, 2015

(65) Prior Publication Data
US 2015/0277062 A1 Oct. 1, 2015

Related U.S. Application Data

(63) Continuation of application No. PCT/IB2013/060573, filed on Feb. 12, 2013.

(30) Foreign Application Priority Data

Dec. 14, 2012 (CN) .................... 2012 2 0698899 U

(51) Int. Cl.
*G02B 6/38* (2006.01)
*G02B 6/44* (2006.01)

(52) U.S. Cl.
CPC ......... *G02B 6/3849* (2013.01); *G02B 6/3826* (2013.01); *G02B 6/3851* (2013.01); *G02B 6/3893* (2013.01); *G02B 6/4465* (2013.01)

(58) Field of Classification Search
None
See application file for complete search history.

(56) References Cited

U.S. PATENT DOCUMENTS

| 6,267,513 | B1 | 7/2001 | Seto et al. | |
|---|---|---|---|---|
| 6,508,593 | B1 | 1/2003 | Farnsworth et al. | |
| 6,994,476 | B1 * | 2/2006 | Yang | G02B 6/4292 |
| | | | | 385/53 |
| 7,164,840 | B2 * | 1/2007 | Hsieh | G02B 6/3849 |
| | | | | 385/134 |
| 7,264,402 | B2 * | 9/2007 | Theuerkorn | G02B 6/3821 |
| | | | | 385/53 |

(Continued)

FOREIGN PATENT DOCUMENTS

JP 2001290046 A 10/2001

OTHER PUBLICATIONS

PCT International Search Report, International Application No. PCT/IB2013/060573, dated Mar. 18, 2014, 5 pages.
Abstract of JP2001290046, dated Oct. 19, 2001, 2 pages.

*Primary Examiner* — Tina Wong
(74) *Attorney, Agent, or Firm* — Merchant & Gould P.C.

(57) ABSTRACT

A dust-proof apparatus for a fiber optic connector has a base; a ferrule receiving sleeve positioned on a mating end of the base; two primary cantilevered arms extending substantially in parallel from the mating end of the base, with the ferrule receiving sleeve being positioned therebetween; and a secondary cantilevered arm extending from the mating end of the base, and having a locking projection receiving hole disposed on a free end.

20 Claims, 8 Drawing Sheets

(56) References Cited

U.S. PATENT DOCUMENTS

| | | | | |
|---|---|---|---|---|
| 7,317,862 B2* | 1/2008 | Minota | ............... | G02B 6/4292 |
| | | | | 385/134 |
| 7,407,330 B2* | 8/2008 | Smith | ................. | G02B 6/3849 |
| | | | | 385/53 |
| 7,556,437 B2* | 7/2009 | Droege | ............... | G02B 6/3849 |
| | | | | 385/139 |
| 8,224,146 B2* | 7/2012 | Hackett | .............. | G02B 6/3825 |
| | | | | 385/134 |
| 8,244,089 B2* | 8/2012 | Chen | ................... | G02B 6/3849 |
| | | | | 385/134 |
| 8,374,478 B2* | 2/2013 | Marcouiller | ........ | G02B 6/3849 |
| | | | | 385/139 |
| 8,559,781 B2* | 10/2013 | Childers | ............. | G02B 6/3869 |
| | | | | 385/134 |
| 8,853,537 B2* | 10/2014 | Kempeneers | ....... | G02B 6/4465 |
| | | | | 174/74 R |
| 2005/0220434 A1* | 10/2005 | Hsieh | .................. | G02B 6/3849 |
| | | | | 385/134 |
| 2007/0217749 A1* | 9/2007 | Jong | ................... | G02B 6/3849 |
| | | | | 385/88 |
| 2010/0111484 A1 | 5/2010 | Allen | | |
| 2011/0188813 A1 | 8/2011 | Marcouiller et al. | | |

* cited by examiner

DUST-PROOF APPARATUS AND FIBER OPTIC CONNECTOR ASSEMBLY

CROSS-REFERENCE TO RELATED APPLICATION

This application is a continuation of PCT International Application No. PCT/IB2013/060573 filed Dec. 2, 2013, which claims priority under 35 U.S.C. §119 to Chinese Patent Application No. 201220698899.5, filed on Dec. 14, 2012.

FIELD OF THE INVENTION

The invention is generally related to a fiber optic connector, and, more specifically, to dust-proof fiber optic connector.

BACKGROUND

In various network communication terminals, such as computers, routers, servers, and exchangers, a user terminal is generally connected to an external cable by inserting a plug connector into a receptacle connector fixed in, for example, a wall. Particularly, in optical fiber telecommunication application, fiber optic connectors are used to achieve coupling, distributing, and switching of different optical fibers.

In some cases, where the fiber optic connector is needed to pass through a small passage, a rope or a hook is secured on the fiber optic connector, and the fiber optic connector is pulled out of the passage by pulling the rope or the hook through the passage. Since the fiber optic connector does not have a feature for securing the rope or the hook thereon, it is difficult to reliably secure the rope or the hook on the fiber optic connector. Furthermore, the rope or the hook may be easily separated from the fiber optic connector during pulling the rope or the hook, and in this case, the fiber optic connector cannot be pulled out of the passage.

SUMMARY

A dust-proof apparatus for a fiber optic connector has a base; a ferrule receiving sleeve positioned on a mating end of the base; two primary cantilevered arms extending substantially in parallel from the mating end of the base, with the ferrule receiving sleeve being positioned therebetween; and a secondary cantilevered arm extending from the mating end of the base, and having a locking projection receiving hole disposed on a free end.

BRIEF DESCRIPTION OF THE DRAWINGS

The invention will now be described by way of example, with reference to the accompanying Figures, of which.

DETAILED DESCRIPTION OF THE EMBODIMENT(S)

Figure 1:
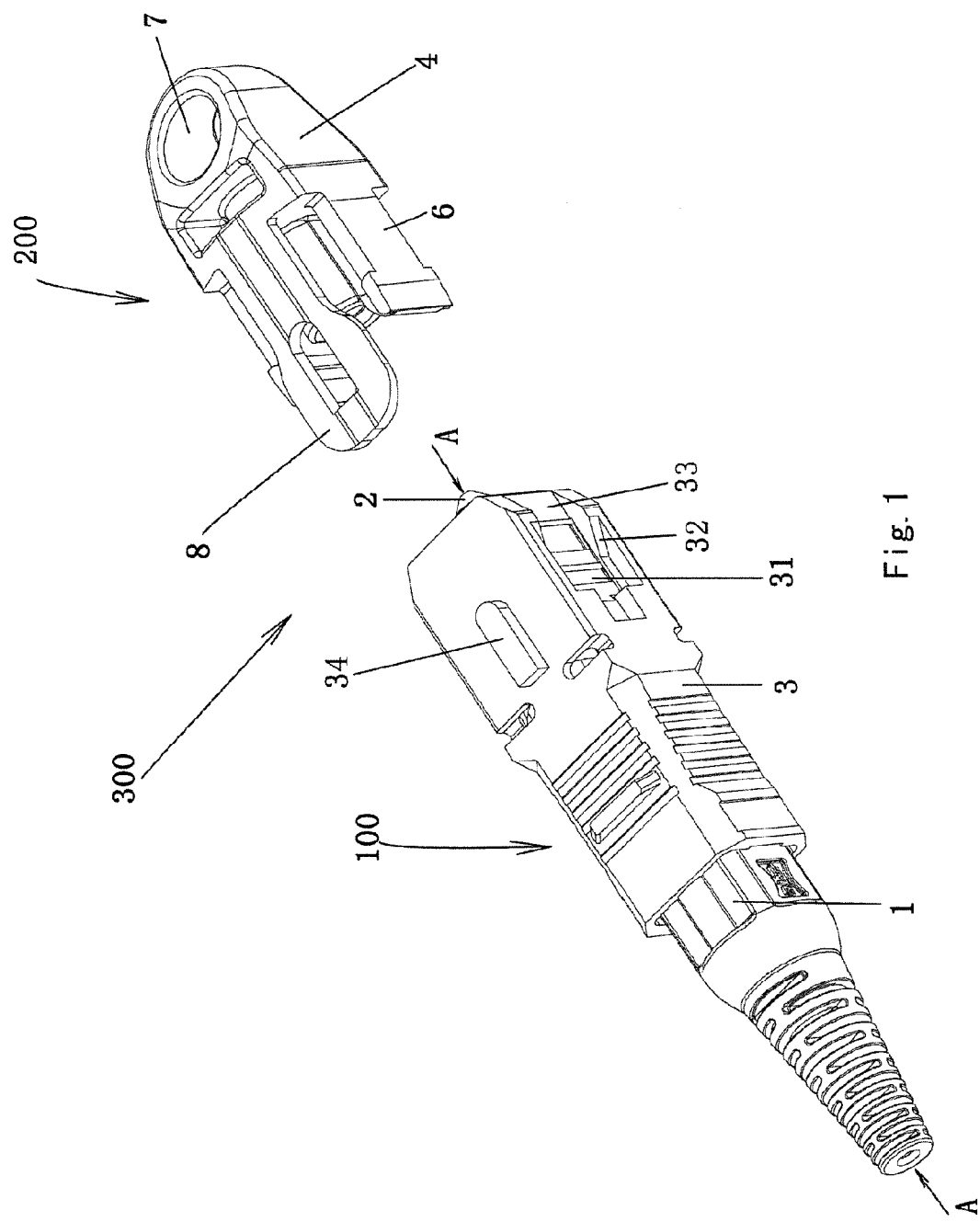
FIG. 1 is a perspective view of a connector assembly having a dust-proof apparatus and a fiber optic connector.

Exemplary embodiments of the invention will be described hereinafter in detail, with reference to the attached drawings, wherein like reference numerals refer to like elements. The invention may, however, be embodied in many different forms and should not be construed as being limited to the embodiments set forth herein; rather, these embodiments are provided so that the disclosure of the invention will be thorough and complete, and will fully convey the concept of the invention to those skilled in the art.

The invention will now be described with reference to FIGS. 1-8. In an embodiment shown in FIG. 1, a connector assembly 300 has a dust-proof apparatus 200 and a fiber optic connector 100. FIG. 1 shows a state in which the dust-proof apparatus 200 is separate from the fiber optic connector 100.

The fiber optic connector 100 can be coupled to a complimentary mating fiber optic connector (not shown), such as a receptacle connector, to achieve quick coupling of fibers of two optical cables (not shown).

Figure 2:
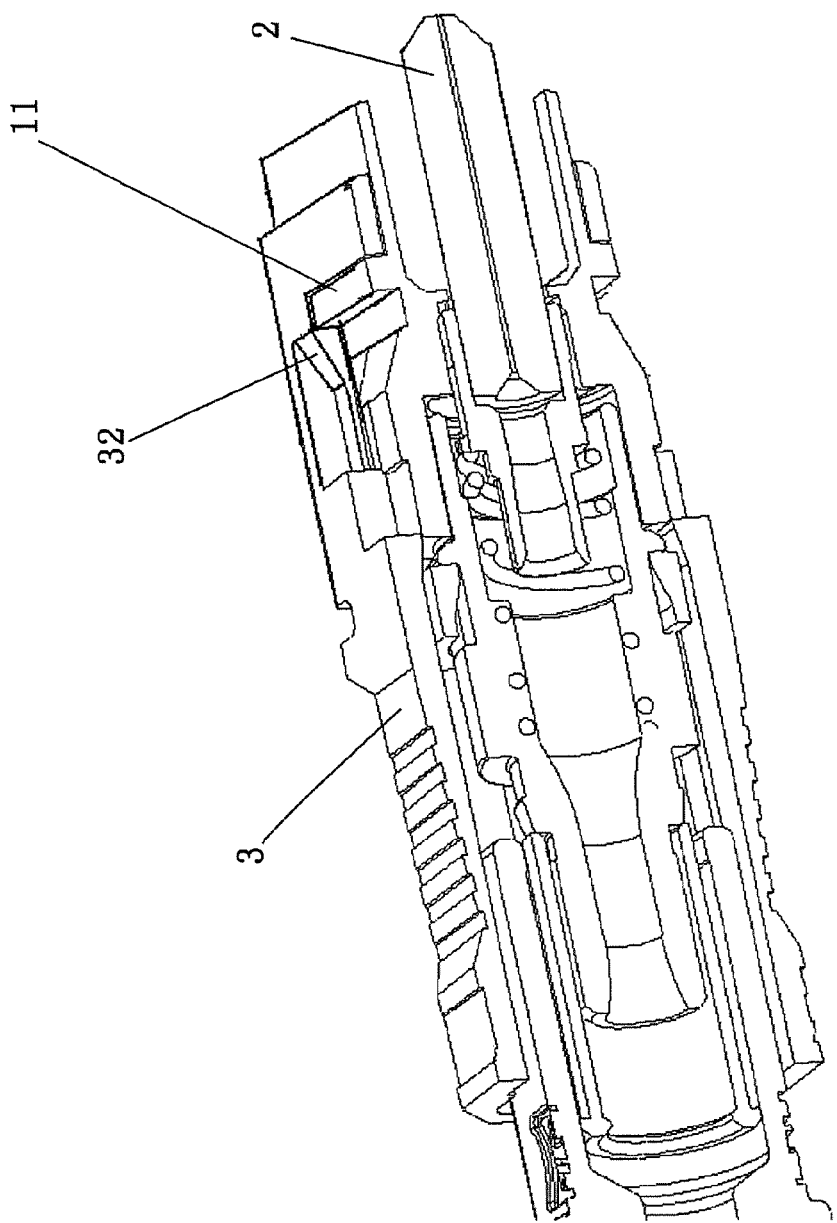
FIG. 2 is a cross-sectional view of the fiber optic connector of FIG. 1 taken in an axis A-A.

As shown in FIGS. 1-2, the fiber optic connector 100 has a body 1 with a cable terminating end on which an optical cable (not shown) to be coupled is secured; a ferrule 2 mounted in the body 1 on an opposite mating end and constructed to receive a fiber of the optical cable to be coupled with a fiber of the mating connector (not shown); and a housing 3 having a cross section with a substantially rectangle shape. The housing 3 is both mounted on the body 1, and is slidable along the body 1 along a longitudinal axis of the fiber optic connector 100. A second locking mechanism (described below) is positioned on the body 1, and an opening 31 is disposed in a location of the housing 3 corresponding to the second locking mechanism, the second locking mechanism being exposed through the opening 31. A second release mechanism (described below) is positioned on at least one of two side walls of the opening 31, the two sidewalls of the opening extending parallel to the longitudinal axis. A locking projection 34 is positioned on the housing 3.

Figure 3:
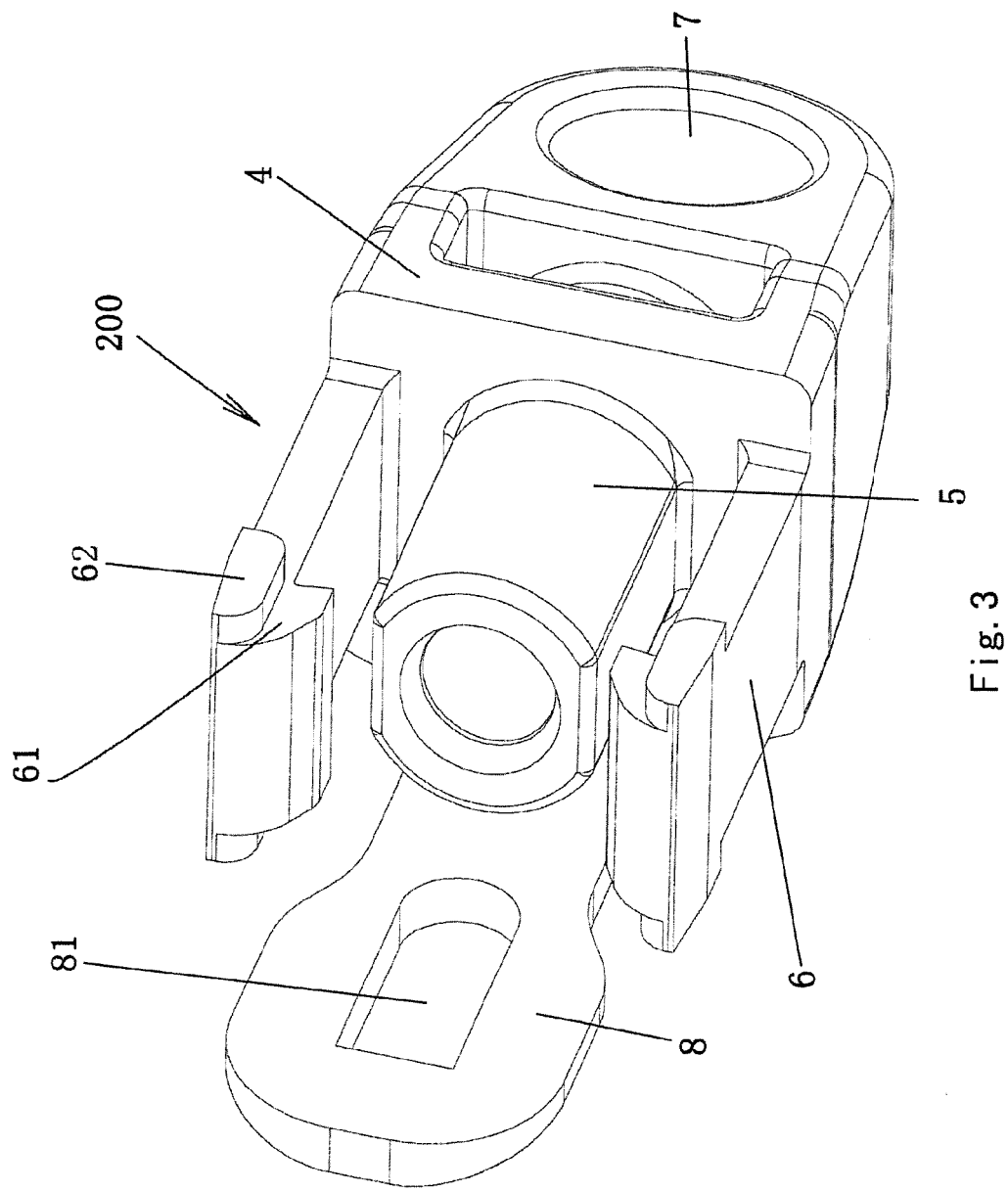
FIG. 3 is a perspective view of the dust-proof apparatus.

In an embodiment shown in FIG. 3, the dust-proof apparatus 200 a base 4 that serves as an operation handle; a ferrule receiving sleeve 5 positioned on one a mating end of the base 4, and having a ferrule receiving space (not labeled) extending longitudinally therethrough. The ferrule 2 of the fiber optic connector 100 is inserted into the ferrule receiving space when the dust-proof apparatus 200 is connected to the fiber optic connector 100. Two primary cantilevered arms 6 are connected to the mating end of the base 4 on a fixed end, each extending substantially in parallel from the base 4 on opposite sides of the ferrule receiving sleeve 5. An secondary cantilevered arm 8 extends from the mating end of the base 4 and has a locking projection receiving hole 81. The locking projection 34 positioned on the housing 3 of the fiber optic connector 100 is inserted into the locking projection receiving hole 81 during mating of the dust-proof apparatus 200 to ensure the primary cantilevered arms 6 are in a locking state where the primary cantilevered arms 6 are locked to the fiber optic connector 100.

In an embodiment, a securing ring 7 is positioned on an opposite terminating end of the base 4. In this way, when the connector assembly 300 needs to pass through a small passageway, a rope or a hook (not shown) may be secured on the securing ring 7, and can be passed through the passageway from one end to the other end. In this way, the entire connector assembly 300 may be moved through the passage from one end to the other end by pulling the rope or the hook.

In an embodiment, each of the primary cantilevered arms 6 includes a first locking mechanism and a first release mechanism. The first locking mechanism is positioned on an inner surface of a free end of the primary cantilevered arm 6 and is configured to be able to be locked on the fiber optic connector 100. The first release mechanism 62 is positioned on at least one of two opposite longitudinal edges of the free end of the primary cantilevered arm 6, being configured to release the first locking mechanism from the fiber optic connector 100. Further, the first locking mechanism is constructed to be complimentary with the second locking mechanism of the fiber optic connector 100, the first release mechanism cooperates with the second release mechanism to unlock the first and second locking mechanisms when the housing 3 slides along the longitudinal axis.

In the fiber optic connector 100 and the dust-proof apparatus 200, the second locking mechanism and the second release mechanism are positioned on the body 1 and housing 3 of the fiber optic connector 100, respectively, and the first locking mechanism and the first release mechanism are positioned on different locations of the free end of the primary cantilevered arm 6, respectively. Thereby, the locking mechanisms and the release mechanisms of the fiber optic connector 100 and the dust-proof apparatus 200 are constructed by different features.

In the embodiment shown in FIG. 2, the second locking mechanism has a second locking protrusion 11 protruding from the body 1. In the embodiment shown in FIG. 3, the first locking mechanism has a first locking protrusion 61 protruding inward at the free end of the primary cantilevered arm 6 towards the ferrule receiving sleeve 5. In an embodiment shown in FIG. 5, when the dust-proof apparatus 200 is connected to the fiber optic connector 100, the first locking protrusion 61 is engaged with the second locking protrusion 11 to prevent the dust-proof apparatus 200 from being separated from the fiber optic connector 100, that is, to prevent the dust-proof apparatus 200 from being displaced in a rightward direction from the fiber optic connector 100 shown in FIG. 5. In an embodiment, the second locking mechanism is a recess formed in the body 1. When the dust-proof apparatus 200 is mounted on the fiber optic connector 100, the first locking protrusion 61 is positioned in the recess to prevent the dust-proof apparatus 200 from being moved away from the fiber optic connector 100.

Figure 5:
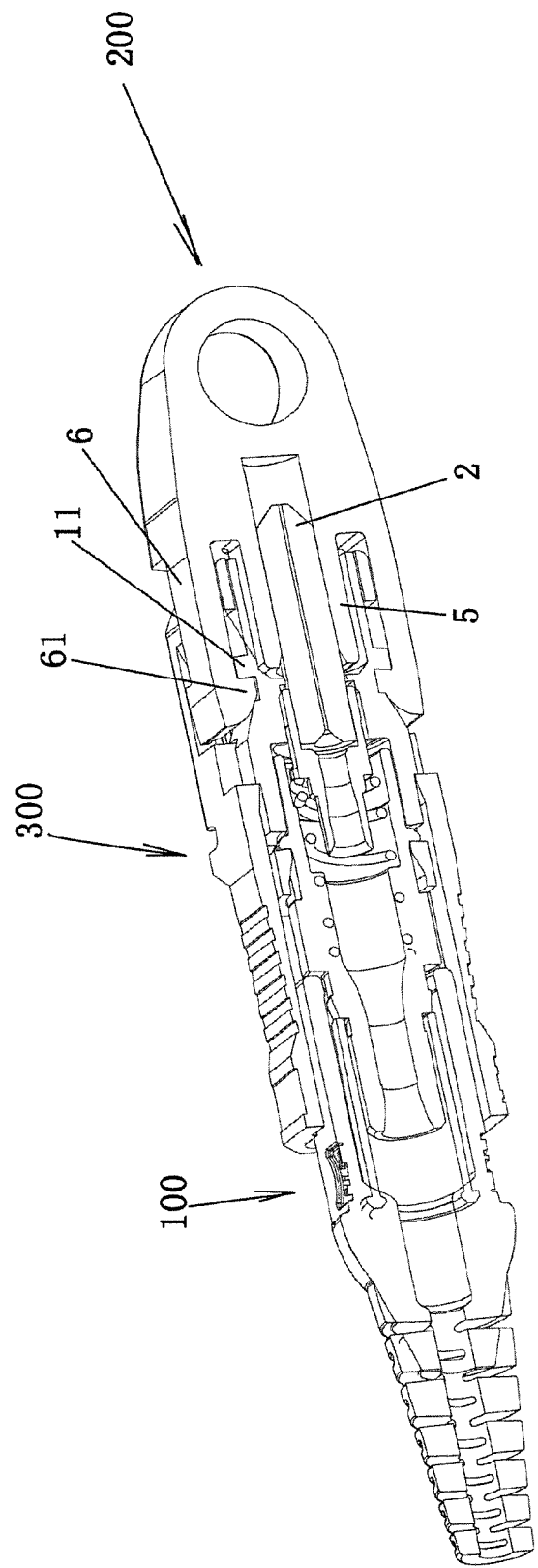
FIG. 5 is a cross-sectional view of the connector assembly of FIG. 4 along the axis A-A.

Referring to the embodiment of FIG. 2, the second release mechanism has a tapered surface 32 on at least one of the sidewalls of the opening 31. As shown in FIG. 3, the complimentary release protrusion 62 protrudes outward at the free end of the primary cantilevered arm 6, orthogonally from the longitudinal axis. As shown in FIG. 5, when the dust-proof apparatus 200 is mounted on the fiber optic connector 100, the release protrusion 62 is positioned at the lowest end of the tapered surface 32.

Figure 7:
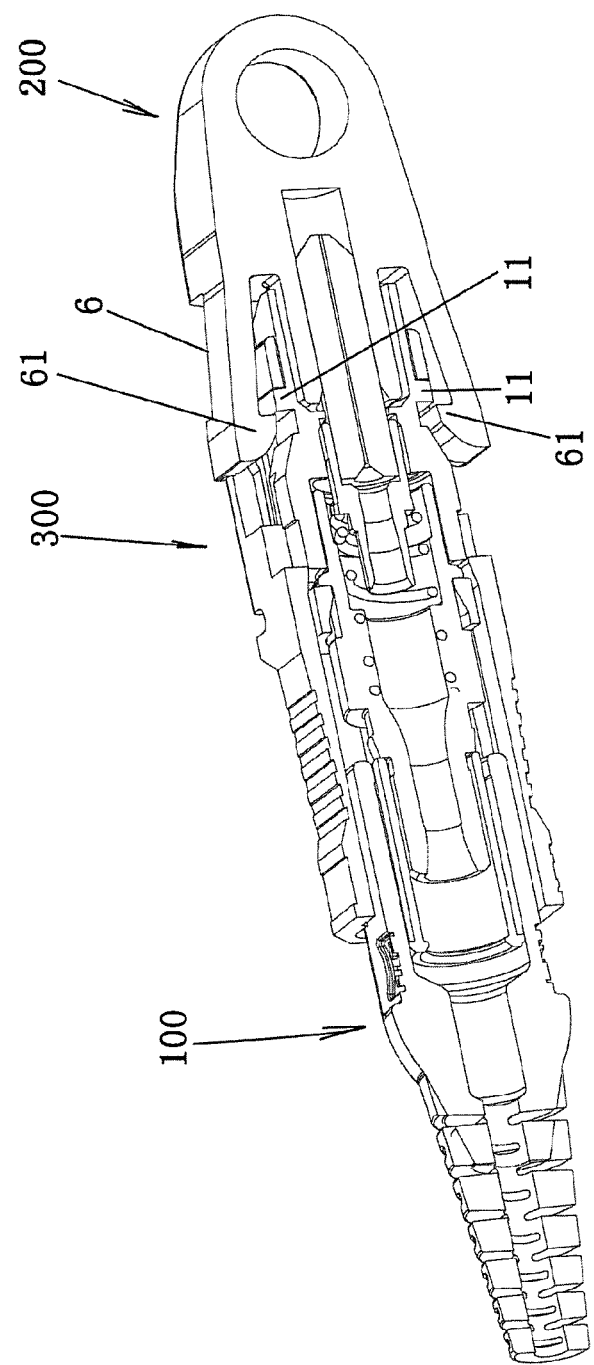
FIG. 7 is a cross-sectional view of the connector assembly of FIG. 4 along axis A-A where the dust-proof apparatus is partially disengaged from the fiber optic connector.
Figure 8:
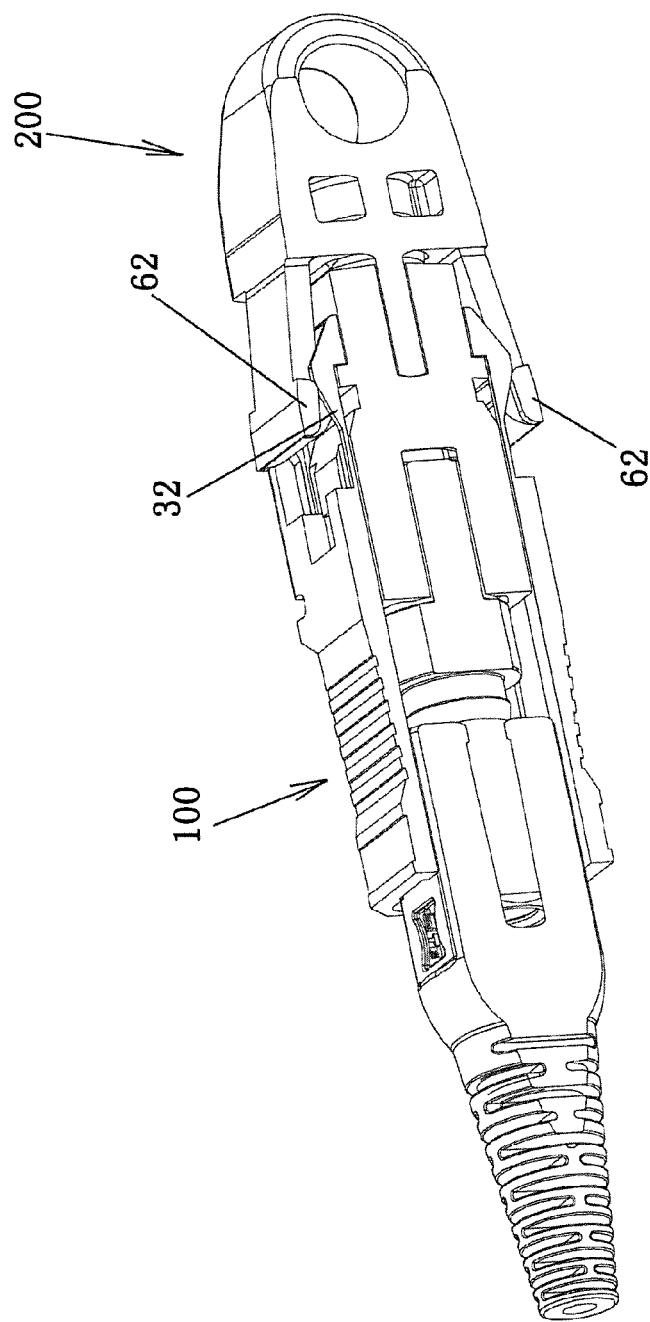
FIG. 8 is a cross-sectional view of the connector assembly of FIG. 4 along line B-B where the dust-proof apparatus is partially disengaged from the fiber optic connector.

In the embodiments shown in FIGS. 7-8, when the dust-proof apparatus 200 is disengaged from fiber optic connector 100, the housing 3 is displaced away from the dust-proof apparatus 200 along the longitudinal axis (in a leftward direction in FIGS. 7-8), the tapered surface 32 is moved backward together with the housing 3, thus driving the release protrusion 62 to slide along the tapered surface 32, so that the primary cantilevered arm 6 is displaced outward to release the engagement of the first locking protrusion 61 and the second locking protrusion 11 or the engagement of the first locking protrusion 61 and the recess. That is, the first locking protrusion 61 moves over the upper surface of the second locking protrusion 11. In this way, the dust-proof apparatus 200 can be removed from the fiber optic connector 100.

In the embodiment shown in FIG. 1, the housing 3 has two guiding grooves 33 extending between the opening 31 and the mating end of the housing 3, for guiding the first locking protrusion 61 to slidingly towards the opening 31. The guiding groove 33 has a width substantially equal to that of the first locking protrusion 61. In this way, during mating of the dust-proof apparatus 200 to the fiber optic connector 100, the first locking protrusions 61 slide in the guiding grooves 33 so that the dust-proof apparatus 200 is connected to the fiber optic connector 100 in a correct position, where the ferrule 2 of the fiber optic connector 100 is accurately inserted into the ferrule receiving sleeve 5 of the dust-proof apparatus 200.

Figure 4:
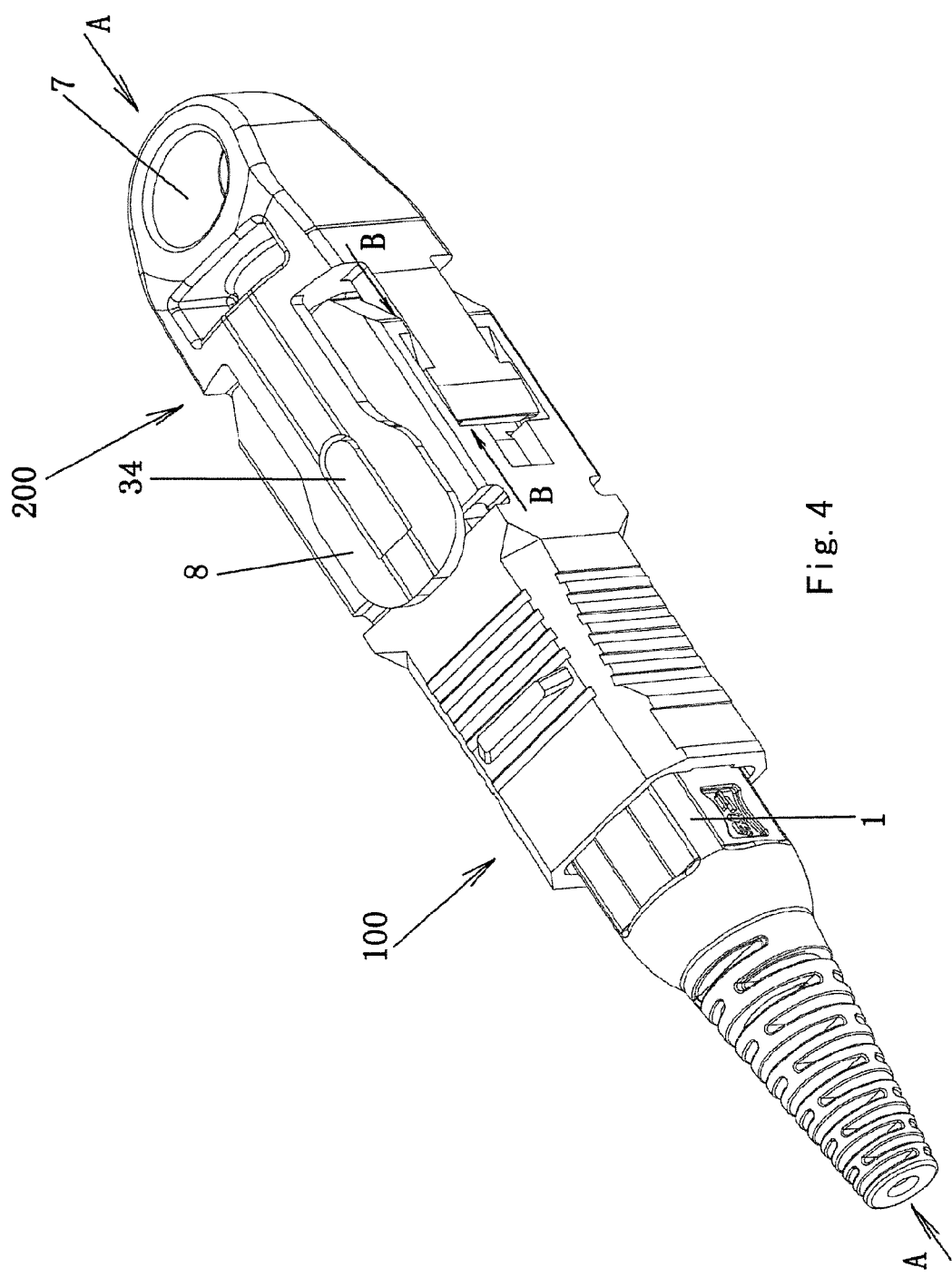
FIG. 4 is a perspective view of the connector assembly where the dust-proof apparatus is engaged with the fiber optic connector.

As shown in FIGS. 3-4, the first locking protrusion 61 has a substantially arc-shaped or rounded mating end surface. As a result, during mounting the dust-proof apparatus 200 to the fiber optic connector 100, the arc-shaped or rounded front end surface of the first locking protrusion 61 may smoothly contact the second locking protrusion 11 and pass over the upper surface of the second locking protrusion 11 to a release state as shown in FIG. 7. The release state is when the primary cantilevered arm 6 is displaced outward by the tapered surface 32. Those of ordinary skill in the art would appreciate that a side of the second locking protrusion 11 may be formed in an arc-shape or a slope-shape to achieve smooth contact.

As shown in FIGS. 3 and 4, when the dust-proof apparatus 200 is connected to the fiber optic connector 100, the secondary cantilevered arm 8 closely abuts against the housing 3 under an inward spring force generated by the cantilevered design, and the locking projection 34 is inserted into the locking projection receiving hole 81. Thus, the housing 3 is prevented from being moved away from the dust-proof apparatus 200. In this way, the release protrusion 62 of the primary cantilevered arm 6 cannot be moved along the tapered surface 32 to further prevent the first locking protrusion 61 from being released from the second locking protrusion 11 by unintentionally moving the housing 3, and further prevent the dust-proof apparatus 200 from being separated from the fiber optic connector 100 by an unintentionally operation.

In this way, the connector assembly 300 is passed through a small passageway, a rope or a hook can be secured on the securing ring 7 of the dust-proof apparatus 200, and the rope or the hook may be passed through the passageway from one end to the other end. The entire connector assembly 300 may be pulled through the passage from one end to the other end by pulling the rope or the hook.

In the embodiment shown in FIG. 4, the dust-proof apparatus 200 has a cross sectional size substantially equal to that of the fiber optic connector 100 in size, so that the dust-proof apparatus 200 does not need to occupy an additional space in a cross sectional of the connector assembly 300. Consequently, if the fiber optic connector 100 can pass through the passageway, and then the dust-proof apparatus 200 also can pass through the passageway. Thus, the entire connector assembly 300 also can pass through the passageway.

In an embodiment, the fiber optic connector 100 has the body 1 for securing an optical cable, a second locking mechanism positioned on the body 1 that is complimentary to the first locking mechanism of the dust-proof apparatus 200; the ferrule 2 for receiving the fiber of the optical cable therein, being mounted in the body 1; and the housing 3 having a substantially rectangle cross section. The housing 3 is positioned on the body 1 and slidable on the body 1 along the longitudinal axis of the fiber optic connector 100. The opening 31 is positioned in a location of the housing 3 corresponding to the second locking mechanism. The second release mechanism, being complimentary in shape with the first release mechanism of the dust-proof apparatus 200, is positioned on at least one of two sidewalls of the opening 31 extending parallel to the longitudinal axis.

Hereafter, a processes of mounting the dust-proof apparatus 200 to the fiber optic connector 100 and removing the dust-proof apparatus 200 from the fiber optic connector 100 will be discussed.

Figure 6:
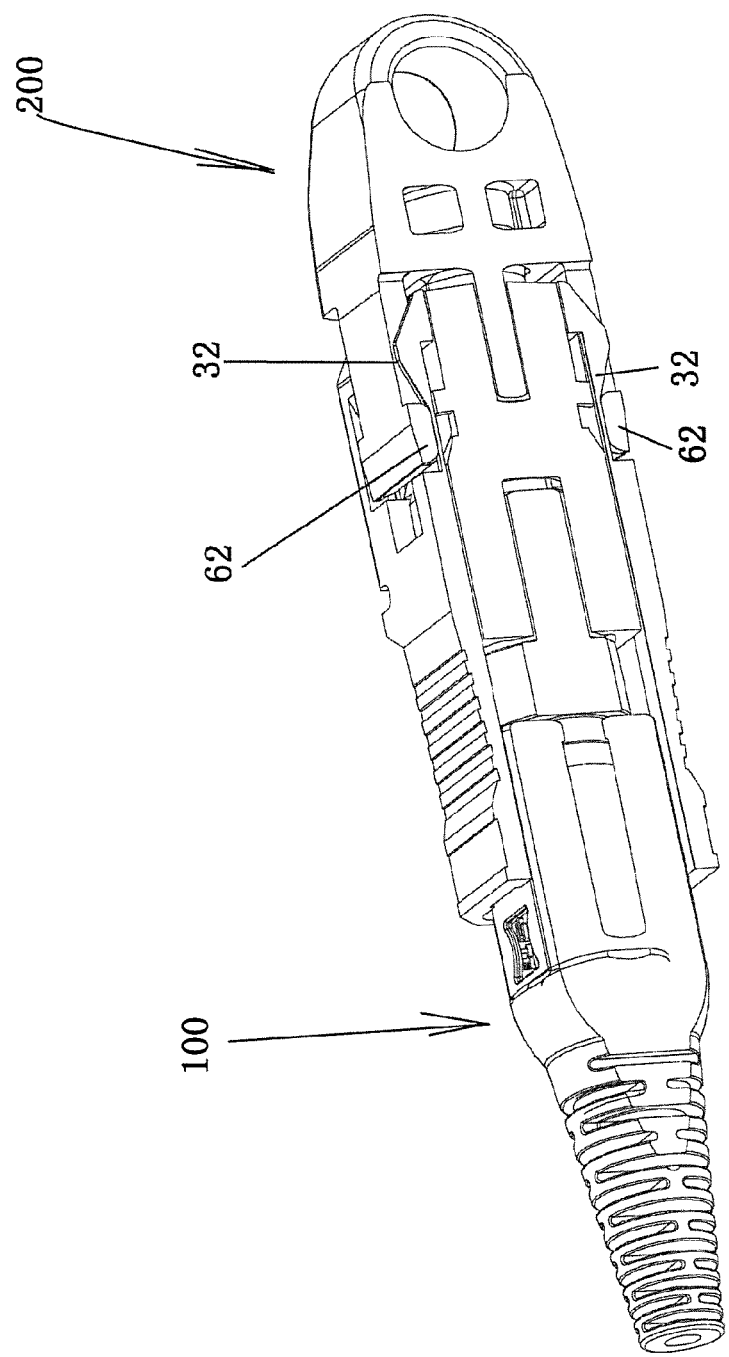
FIG. 6 is a cross-sectional view of the connector assembly of FIG. 4 along line B-B.

To mount the dust-proof apparatus 200 to the fiber optic connector 100, an operator firstly holds the base 4 of the dust-proof apparatus 200 such that the first locking protrusions 61 are in alignment with the guiding grooves 33 of the fiber optic connector 100, along the longitudinal axis. The dust-proof apparatus 200 is then displaced towards the fiber optic connector 100, so that the arc-shaped front end surfaces of the first locking protrusions 61 smoothly contact the second locking protrusion 11, with the primary cantilevered arms 6 being expanded outward by the second locking protrusion 11 as the first locking protrusion 11 passes over the upper surface of the second locking protrusion 11. Thereby a locking state as shown in FIGS. 4-6 is achieved. Simultaneously, the ferrule 2 of the fiber optic connector 100 is inserted into the ferrule receiving space of the ferrule receiving sleeve 5. As a result, the two primary cantilevered arms 6 of the dust-proof apparatus 200 are reliably locked to the fiber optic connector 100, and the locking projection 34 on the housing 3 of the fiber optic connector 100 is inserted into the locking projection receiving hole 81 of the secondary cantilevered arm 8 to achieve a double-lock of the dust-proof apparatus 200 and the fiber optic connector 100. In this condition, the dust-proof apparatus 200 can protect the ferrule 2 from damaged by external forces, with dust, moisture, water and other contaminants being prevented from entering into the ferrule 2. Once the dust-proof apparatus 200 has been mated to the fiber optic connector 100, even if a large pulling force is exerted on the dust-proof apparatus 200, the dust-proof apparatus 200 is not easily disengaged from the fiber optic connector 100.

In a process of removing the dust-proof apparatus 200 from the fiber optic connector 100, an operator firstly operates the secondary cantilevered arm 8 to expand the secondary cantilevered arm 8 outward so as to disengage the locking projection 34 from the locking projection receiving hole 81 in the secondary cantilevered arm 8, releasing the locking of the locking projection 34 and the locking projection receiving hole 81 so that the housing 3 can be moved. Thereafter, the operator displaces the housing 3 to slide the housing 3 away from the body 1 of the fiber optic connector 100 (in a leftward direction in FIG. 2 or in a rightward direction in FIG. 8). At this time, the tapered surface 32 moves together with the housing 3, thus forcing the release protrusion 62 to slide along the length of the tapered surface 32. As the release protrusion 62 slides on the tapered surface, the primary cantilevered arm 6 expands outward to release the engagement of the first locking protrusion 61 and the second locking protrusion 11. In this way, the dust-proof apparatus 200 can be removed from the fiber optic connector 100.

Those of ordinary skill in the art would appreciate that the above embodiments are intended to be exemplary, and not restrictive. For example, many modifications may be made to the above embodiments by those skilled in the art, and various features described in different embodiments may be freely combined with each other without conflicting in configuration or principle. As such, additional embodiments of fiber optic connectors and dust-proof apparatus can be achieved with overcoming the technical problems addressed by the invention.

Although several exemplary embodiments have been shown and described, those of ordinary skill in the art would appreciate that various changes or modifications may be made without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "an embodiment" or "the embodiment" are not intended to be interpreted as excluding the existence of additional embodiments that also incorporate the recited features. Moreover, unless explicitly stated to the contrary, embodiments "comprising" or "having" or "including" an element or a plurality of elements having a particular property may include additional such elements not having that property.

What is claimed is:

1. A dust-proof apparatus for a fiber optic connector, comprising: a base; a ferrule receiving sleeve positioned on a mating end of the base and extending from the mating end of the base in a first direction; two primary cantilevered arms extending substantially in parallel and substantially in the first direction from the mating end of the base, with the ferrule receiving sleeve being positioned therebetween; and a secondary cantilevered arm extending from the mating end of the base, and having a locking projection receiving hole disposed on a free end.

2. The dust-proof apparatus according to claim 1, wherein each of the primary cantilevered arms has: a first locking mechanism positioned on an inner surface of the free end of the primary cantilevered arm; and a first release mechanism positioned on at least one of two opposite longitudinal edges of the free end of the primary cantilevered arm.

3. The dust-proof apparatus according to claim 2, wherein the first locking mechanism includes a first locking protrusion protruding inward towards the ferrule receiving sleeve.

4. The dust-proof apparatus according to claim 2, wherein the first release mechanism includes a release protrusion protruding orthogonally outward from the free end of the primary cantilevered arm.

5. The dust-proof apparatus according to claim 3, wherein the first locking protrusion has a free end surface having a substantially arced or rounded surface.

6. The dust-proof apparatus according to claim 1, further comprising a securing ring positioned on a terminating end of the base, the terminating end of the base being opposite the mating end of the base.

7. A connector assembly, comprising: a fiber optic connector; and a dust-proof apparatus having: a base; a ferrule receiving sleeve positioned on a mating end of the base and extending from the mating end of the base in a first direction, two primary cantilevered arms extending substantially in parallel and substantially in the first direction from the mating end of the base, with the ferrule receiving sleeve being positioned therebetween, and a secondary cantilevered arm extending from the mating end of the base, and having a locking projection receiving hole disposed on a free end.

8. The connector assembly according to claim 7, wherein the fiber optic connector includes: an optical cable securing body having a second locking mechanism complementary to the first locking mechanism.

9. The connector assembly according to claim 8, wherein the fiber optic connector further includes an optical fiber receiving ferrule positioned on a mating end of the body.

10. The connector assembly according to claim 9, wherein the fiber optic connector further includes a housing slidably mounted on the body.

11. The connector assembly according to claim 10, wherein the housing has an opening disposed on the housing, the opening having two sidewalls extending parallel to the longitudinal axis of the fiber optic connector, and the second locking mechanism being exposed therethrough.

12. The connector assembly according to claim 11, wherein the housing has a second release mechanism complementary to the first release mechanism.

13. The connector assembly according to claim 12, wherein the second release mechanism is positioned on at least one of the two sidewalls of the opening.

14. The connector assembly according to claim 13, wherein the second release mechanism is a tapered surface extending outward from at least one of the sidewalls of the opening.

15. The connector assembly according to claim 12, wherein the second locking mechanism is a second locking protrusion protruding from the body, or a recess disposed in the body.

16. The connector assembly according to claim 11, wherein the housing further includes two cantilevered arm guiding grooves extending between the opening and a mating end of the housing.

17. The connector assembly according to claim 7, wherein a locking projection complementary to the locking projection receiving hole of the secondary cantilevered arm is positioned on the housing.

18. The connector assembly according to claim 17, wherein the locking projection is positioned in the locking projection receiving hole when the fiber optic connector is mated to the dust-proof apparatus.

19. The dust-proof apparatus according to claim 1, wherein the locking projection receiving hole is enclosed.

20. The dust-proof apparatus according to claim 6, wherein the securing ring is integral with the base.

* * * * *